Jan. 22, 1952    G. T. BRUMMEL    2,583,320
HOOK
Filed June 28, 1949    2 SHEETS—SHEET 1
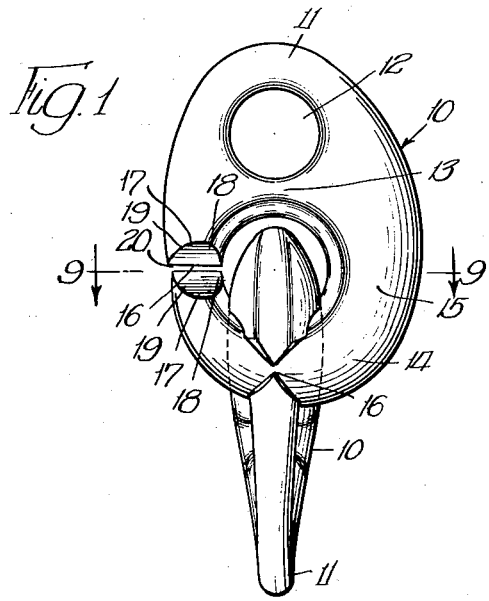
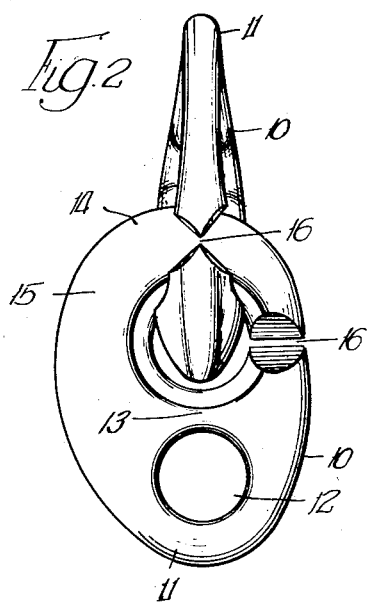
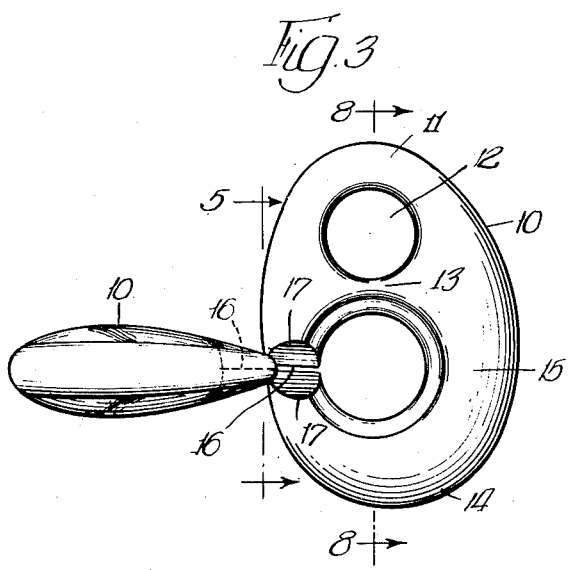
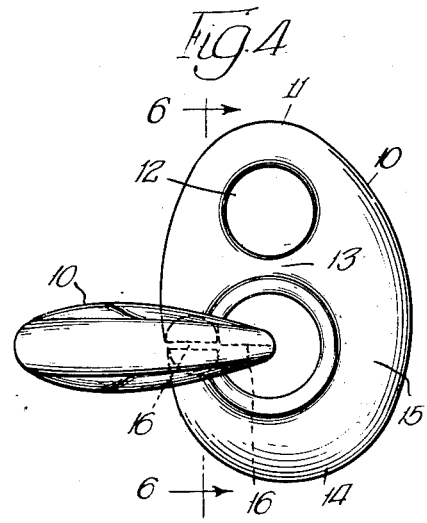
INVENTOR.
Gordon T. Brummel,
BY
Cromwell, Greist & Warden
Attys Jan. 22, 1952     G. T. BRUMMEL     2,583,320
HOOK
Filed June 28, 1949     2 SHEETS—SHEET 2
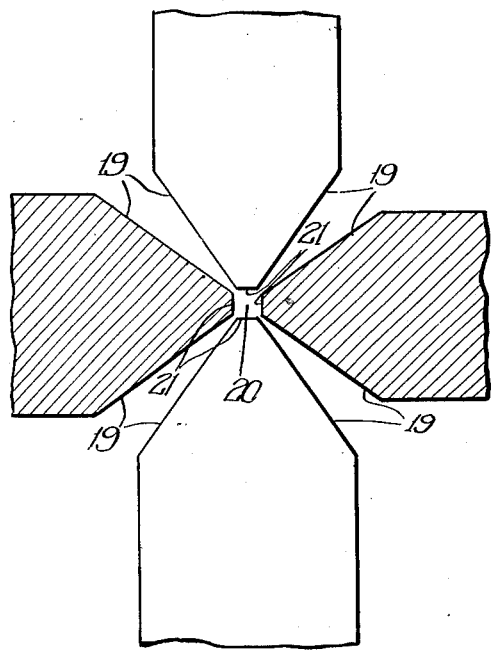
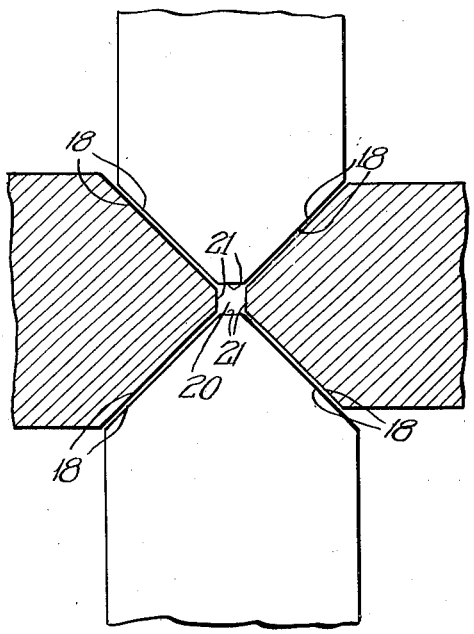
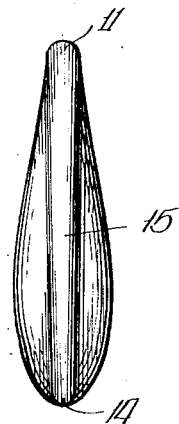
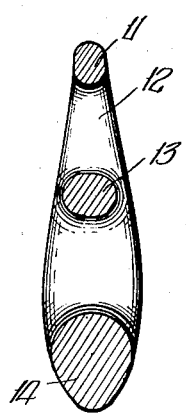
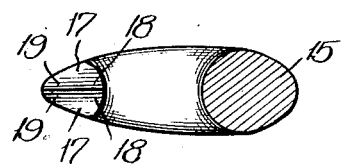
INVENTOR.
Gordon T. Brummel,
BY
Cromwell, Greist & Warden
Attys Patented Jan. 22, 1952

2,583,320

UNITED STATES PATENT OFFICE 2,583,320

HOOK

Gordon T. Brummel, Chicago, Ill.

Application June 28, 1949, Serial No. 101,840

3 Claims. (Cl. 24—230.5)

This invention relates to improvements in hook constructions and is more particularly concerned with hooks which are adapted to be used in pairs and which are characterized by being readily engaged in interlocking relation to provide a positive connection which cannot accidentally come unhooked.

It is a general object of the invention to provide an improved hook construction wherein the hook is provided with a locking entrance which is characterized by double wedge formations so that a pair of the hooks may be interlocked with each other by positioning the hooks at right angles to each other with the locking entrances in alignment and thereafter moving the hooks toward each other, the wedge formations which define the locking entrances being so constructed that upon initial engagement there is substantial clearance between adjacent wedge formations which clearance decreases upon movement to interlocking position so that upon complete interlocking engagement subsequent unhooking will not occur accidentally but can be accomplished only by manually positioning the hooks in right-angled relation with the locking entrances in alignment and subsequently moving the hooks from each other.

It is a more specific object of the invention to provide an improved construction in hoisting hooks, swivel jaw hooks, nut hooks and the like, which comprises providing a hook portion having a locking entrance extending transversely of the longitudinal axis of the hook, which locking entrance is defined by wedge-like surfaces in diverging opposed spaced relation, each surface being in approximately the same plane as the diagonally opposite surface and the angle of inclination of each surface relative to a plane through the transverse center of the locking entrance being approximately 90 degrees adjacent the inside of the hook portion and approximately 110 degrees adjacent the outside of the hook portion.

These and other objects of the invention will be apparent from a consideration of the preferred embodiment of the hook construction which is shown by way of illustration in accompanying drawings, wherein:

Fig. 1 is a view showing a pair of hooks which embody the principles of the invention, the hooks being positioned in interlocked relation with the uppermost hook in side elevation and the lowermost hook in front edge elevation;

Fig. 2 is a view of the hooks shown in Fig. 1 with the uppermost hook in front end elevation and the lowermost hook in side elevation;

Fig. 3 is a view similar to Fig. 1 showing the hooks in position for initial engagement, the uppermost hook being in side elevation and the lowermost hook being in end elevation;

Fig. 4 is a view similar to Fig. 3, but with the lowermost hook moved to a position just prior to complete interlocking with the uppermost hook;

Fig. 5 is a section on the line 5—5 of Fig. 3, to an enlarged scale;

Fig. 6 is a section on the line 6—6 of Fig. 4, to an enlarged scale;

Fig. 7 is an elevation of the back edge of one of the hooks;

Fig. 8 is a section on the line 8—8 of Fig. 3;
and

Fig. 9 is a section on the line 9—9 of Fig. 1, with the lowermost hook removed.

Referring to the drawings, there is shown for the purposes of illustration a device which incorporates therein the principles of the invention. The improved construction resides principally in the hook portion of the device and is equally applicable to other devices of this character regardless of the nature of the fastener portion such as, for example, nut hooks, swivel jaw hooks, and the like.

The illustrated hook 10 comprises a bail portion 11 and a fast eye 12 by means of which the hook is secured to the hoisting line or similar device with which it is used. A stud portion 13 separates the fast eye 12 from the hook section 14. The stud portion 13 and the hook section 14 are joined at one side by the lever arm section 15 and an entrance 16 is provided between the same at the opposite side. The cross section of the material forming the lever arm section 15 and the hook section 14 is substantially greater in area than the cross section of the other portions of the device to insure adequate strength for maximum load at the points where the strain under load is the greatest and where failure is most likely to occur in devices of this character.

The locking entrance 16 is defined by wedge formations comprising pairs of outwardly diverging tapered surfaces 17 in opposed spaced relation. Each surface 17 is in approximately the same plane as the diagonally opposite surface. Each surface 17 is tapered in two directions relative to a plane passing through the entrance 16 and normal to the longitudinal axis of the hook. The inner portion 18 of each surface 17 adjacent the inside of the hook (Fig. 6) is inclined at an angle approximately 90 degrees relative to the transverse plane while the outer portion 19 of each surface is inclined at an angle of approximately 110 degrees, relative to the same plane. Each surface portion 18 and 19 of the wedge formation on one side of the entrance 16 is in substantially the same plane as the corresponding surface portion on the opposite side of the wedge formation on the other side of the entrance 16. A space 20 is provided between the opposed wedge formations by squaring off the converging edges of each pair of surfaces 17 which form the respective wedge formations at 21 (Figs. 5 and 6). The space 20, separating the juxtaposed edges of opposed surfaces 17 is relatively narrow and substantially uniform.

With the surfaces 17 formed in the manner described the hook portion of the device 10 may be engaged in interlocking relation with the hook portion of a similar device having an entrance defined by surfaces of the same character. In placing a pair of the devices in engagement they must be positioned with the locking entrances 16 in alignment and with the body portions in planes normal to each other in two directions (Fig. 3). The devices are thereafter moved toward each other (Fig. 4) to interengage the hook portions. The angular relation of the wedge formations 17 provides an easy, sloppy fit as initial interlocking movement begins (Fig. 3) and a progressively closer fit as the interlocking movement is continued (Fig. 4). When it is desired to disengage the members they must be positioned in planes substantially normal to each other with the entrances aligned and thereafter moved apart while in that relation. As the separating movement progresses the wider angular relation of the portions 19 of the surfaces 17 permits the angular relation of the members to be altered somewhat, the degree of alteration or tilting relative to each other which is permitted being increased as the members approach complete separation. As a result of this construction the members are relatively easy to align and move into interlocking engagement but unlocking or disengagement of the members requires almost exact alignment and positioning so that accidental disengagement is reduced to a minimum and in actual practice never occurs.

The hook portion is preferably formed of a wear resistant material such as bronze metal, or the like, but other appropriate materials may be employed where desired.

The degree of inclination of the outer portions 19 of the surfaces 17 is not critical since a relatively sloppy fit is desired for initiating the engaging movement but the degree of inclination of the inner surface portions 18 should not be varied substantially in order to insure that the hook portions will not be subject to accidental disengagement.

While specific materials and details of construction have been referred to in describing the illustrated device it will be understood that other materials and other details of construction may be resorted to within the spirit of the invention.

I claim:

1. A coupling device comprising a hook forming portion having an aperture extending therethrough from one face to the opposite face, and a locking entrance providing a passageway for movement into said aperture of a hook forming portion on a cooperating coupling device, said entrance into the aperture comprising a long narrow slot which is formed between the edges of two confronting wedge-shaped tips, which tips are arranged with their edges in slightly spaced generally parallel relation to each other and which are characterized by converging faces on each of said confronting tips, the faces on each tip being at substantially a right angle to each other at the inner end of the entrance and at a lesser angle at the outer end of the entrance.

2. A coupling device comprising a hook forming portion having an aperture extending therethrough from one face to the opposite face, and a locking entrance providing for movement into said aperture of a hook forming portion on a cooperating coupling device, said locking entrance comprising confronting wedge-shaped tips which are separated by a relatively narrow passageway, each of said tips being formed with faces diverging from each other outwardly of said passageway, each face having an inner portion substantially at right angles to the inner portion of the corresponding face on the opposite tip and an outer portion at a greater angle relative to the outer portion of the corresponding face on the opposite tip.

3. A coupling device having a hook portion provided with a locking entrance, said hook portion being adapted for interlocking engagement with the hook portion of a similar device having a locking entrance of the same character, said locking entrance being defined by opposed generally wedge-shaped tips which are spaced from each other by a relatively narrow slot, said wedge-shaped tips comprising opposed pairs of tapered surfaces, the respective surfaces of each pair diverging outwardly and each tapered surface having an inner portion substantially at right angles to the inner portion of the corresponding surface on the opposite tip and an outer portion at a greater angle relative to the outer portion of the corresponding surface on the opposite tip, with each portion of each surface in approximately the same plane as the corresponding portion of the surface diagonally opposite therefrom.

GORDON T. BRUMMEL.

REFERENCES CITED

The following references are of record in the file of this patent:

UNITED STATES PATENTS

| Number | Name | Date |
|---|---|---|
| 367,969 | Gawn | Aug. 9, 1887 |
| 975,323 | Brown | Nov. 8, 1910 |
| 1,016,260 | Fuchs | Feb. 6, 1912 |

FOREIGN PATENTS

| Number | Country | Date |
|---|---|---|
| 6,580 | Great Britain | Apr. 19, 1884 |
| 16,908 | Great Britain | Sept. 8, 1893 |
| 29,710 | Denmark | May 29, 1922 |